United States Patent
Guenther et al.

(10) Patent No.: US 10,166,862 B2
(45) Date of Patent: Jan. 1, 2019

(54) METHOD FOR DETECTING A STICKING TANK VENT VALVE

(71) Applicant: Robert Bosch GmbH, Stuttgart (DE)

(72) Inventors: Florian Guenther, Schwieberdingen (DE); Guido Schock, Loewenstein (DE); Jochen Knecht, Reutlingen (DE); Thomas Herges, Eberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/746,705

(22) PCT Filed: Jul. 4, 2016

(86) PCT No.: PCT/EP2016/065649
§ 371 (c)(1),
(2) Date: Jan. 22, 2018

(87) PCT Pub. No.: WO2017/016804
PCT Pub. Date: Feb. 2, 2017

(65) Prior Publication Data
US 2018/0208054 A1    Jul. 26, 2018

(30) Foreign Application Priority Data

Jul. 27, 2015    (DE) ........................ 10 2015 214 183

(51) Int. Cl.
*F02D 41/00*    (2006.01)
*F02D 41/22*    (2006.01)
(Continued)

(52) U.S. Cl.
CPC ...... *B60K 15/03519* (2013.01); *F02D 41/004* (2013.01); *F02D 41/0045* (2013.01);
(Continued)

(58) Field of Classification Search
CPC .... B60K 15/03519; B60K 2015/03514; F02D 41/004; F02D 41/0045; F02D 41/221; F02D 2041/224; F02M 25/0836
(Continued)

(56) References Cited

U.S. PATENT DOCUMENTS 4,962,744 A * 10/1990 Uranishi ............ F02M 25/0809
123/198 D
5,243,944 A * 9/1993 Blumenstock ..... F02M 25/0809
123/520
(Continued)

FOREIGN PATENT DOCUMENTS

EP    0451313 A1    10/1991

OTHER PUBLICATIONS

International Search Report dated Nov. 25, 2016, of the corresponding International Application PCT/EP2016/065649 filed Jul. 4, 2016.

*Primary Examiner* — Erick Solis
(74) *Attorney, Agent, or Firm* — Norton Rose Fulbright US LLP; Gerard Messina

(57) ABSTRACT

A method for detecting a sticking tank vent valve in a motor vehicle, a temperature sensor being situated in a tank vent line between the tank vent valve and an inlet point into an intake manifold or into a turbocharger and sticking of the tank vent valve being detected when the absolute value of a correlation of a calculated tank ventilation mass flow and of a signal value of the temperature sensor violates a predefinable threshold value.

8 Claims, 3 Drawing Sheets

(51) Int. Cl.
*B60K 15/035* (2006.01)
*F02M 25/08* (2006.01)
*F02M 33/08* (2006.01)

(52) U.S. Cl.
CPC ....... *F02D 41/221* (2013.01); *F02M 25/0836* (2013.01); *F02D 2041/224* (2013.01); *F02M 33/08* (2013.01); *Y02T 10/40* (2013.01)

(58) Field of Classification Search
USPC .................. 123/519, 520, 690; 73/114.39
See application file for complete search history.

(56) References Cited

U.S. PATENT DOCUMENTS

| | | | | |
|---|---|---|---|---|
| 8,033,271 | B2* | 10/2011 | Yoshimura | F02D 41/0032 123/520 |
| 2004/0250805 | A1* | 12/2004 | Osanai | F02D 41/004 123/698 |
| 2004/0261765 | A1* | 12/2004 | Osanai | F02D 41/0045 123/325 |
| 2009/0240443 | A1* | 9/2009 | Wild | F02D 41/0045 702/45 |
| 2010/0223984 | A1* | 9/2010 | Pursifull | F02M 25/0836 73/114.39 |
| 2015/0122228 | A1* | 5/2015 | Bolger | F02M 25/0836 123/518 |
| 2018/0030932 | A1* | 2/2018 | Dudar | F02M 25/0809 |

\* cited by examiner

METHOD FOR DETECTING A STICKING TANK VENT VALVE

FIELD

The present invention relates to a method for detecting a sticking tank vent valve. Moreover, the present invention relates to a computer program which carries out each step of the method according to the present invention while it is running on a computer, as well as a machine-readable memory medium which stores the computer program. Finally, the present invention relates to an electronic control unit, which is configured to carry out the method according to the present invention.

BACKGROUND INFORMATION

In order to comply with the increasingly stricter emission limits, it is essential in automotive technology to reliably detect defects in a tank ventilation system. This prevents fuel vapors from escaping unnoticed from the tank and fuel supply system.

A tank ventilation system as well as a method and a device for checking its operability is described in German Patent No. DE 41 26 880 A1. Here, the device includes an adsorption filter with a venting opening, a supply line to a tank, and a connecting line with an inserted tank vent valve to the intake manifold of the engine, as well as a temperature sensor for detecting the temperature of the adsorption material. Furthermore, there is a second temperature sensor in the tank ventilation system which is situated near the venting opening of the adsorption filter. The method for checking the operability of the tank ventilation system includes the following steps: initially, the temperature of the adsorption material is measured before the first regeneration of the material after a fueling operation. The temperature of the adsorption material is subsequently measured at a predefined point in time after the start of the first regeneration. Thereafter, the material temperature difference between the first and the second measured value is formed. Furthermore, the temperature of the venting air is measured before the first regeneration and at a predefinable point in time after the start of the first regeneration. The venting air temperature difference between the second and the first measured value is formed. By subtracting the venting air temperature difference from the material temperature difference, a regeneration temperature difference is obtained. This regeneration temperature difference is compared to a threshold value and the device is considered to be operational when the regeneration temperature difference exceeds the threshold value.

SUMMARY

In an example method according to the present invention for detecting a sticking tank vent valve in a motor vehicle, a temperature sensor being situated in a tank vent line between the tank vent valve and an inlet point into an intake manifold or into a turbocharger, sticking of the tank vent valve is detected if the absolute value of a correlation of a calculated tank ventilation mass flow and of a signal value of the temperature sensor violates a predefinable threshold value. This approach is very advantageous since not only may a defect in the tank vent valve be detected in this way, but it may also be specified what defect is present.

According to one preferred specific embodiment of the present invention, when the tank vent valve is being activated, a closed sticking of the tank vent valve is detected if the absolute value of the correlation of a calculated tank ventilation mass flow and of a signal value of the temperature sensor falls below a predefinable first threshold value. In the process, the tank ventilation mass flow is calculated from the environmental conditions, i.e., the setpoint activation, while in the case of the closed sticking tank vent valve, the real tank ventilation mass flow is zero kg/h. If the correlation of the calculated tank ventilation mass flow and of a signal value of the temperature sensor is less than the first predefinable threshold value, for example, 0.75, a closed sticking tank vent valve is detected. In this way, it is possible in an advantageous manner to quickly detect that a tank vent valve is not opening.

In particular, when the tank vent valve is not being activated, an open sticking of the tank vent valve is detected if the absolute value of the correlation of a calculated tank ventilation mass flow and of a signal value of the temperature sensor exceeds a second predefinable threshold value. Here, the second predefinable threshold value is not equal to the first predefinable threshold value. The calculated tank ventilation mass flow is zero kg/h in this case since the tank vent valve is expected to be closed. But because of the defect, the real tank ventilation mass flow is greater than zero kg/h. If the absolute value of the correlation of the calculated tank ventilation mass flow and of the signal value of the temperature sensor exceeds a predefinable threshold value, for example, 0.3, an open sticking of the tank vent valve is detected. An advantage of this approach is that it may promptly be detected that the tank vent valve has not closed.

The diagnosis of the tank vent valve is preferably discontinued when at least one operating condition changes by more than one applicable threshold value. This advantageously rules out disruptive factors and a change in temperature associated therewith from negatively affecting the signal of the temperature sensor and resulting in an error in the interpretation of the signal deviation of the temperature sensor.

The changing operating condition is in particular a motor vehicle speed and/or an internal combustion engine speed. This is very advantageous since both variables directly affect the temperature of the internal combustion engine and consequently have a direct impact on the signal of the temperature sensor.

According to one preferred specific embodiment of the present invention, to further increase the selectivity, a signal of a reference temperature sensor, situated outside of the tank vent line, is taken into account when detecting a sticking tank vent valve. An advantage of the reference temperature sensor is that a diagnosis of the tank vent valve may be carried out largely independently of environmental conditions, such as for instance the speed of the motor vehicle. Furthermore, detecting an open or closed sticking of the tank vent valve is possible in this way; measures, such as for instance, discontinuing the diagnosis at an excessive change in the speed of the motor vehicle and/or in the speed of the internal combustion engine, may be dispensed with.

The present invention furthermore includes a computer program, which is configured to carry out each step of the method according to the present invention, in particular when it is executed on a computer or an electronic control unit. It facilitates the implementation of the method according to the present invention on an electronic control unit without having to make any structural changes thereto.

The present invention moreover includes a machine-readable memory medium on which the computer program is stored as well as an electronic control unit which is configured to carry out the method according to the present invention.

Further advantages and features of the present invention arise from the following description of exemplary embodiments in combination with the figures. Here, the individual features may be implemented individually or in combination with one another.

DETAILED DESCRIPTION OF EXAMPLE EMBODIMENTS

Figure 1:
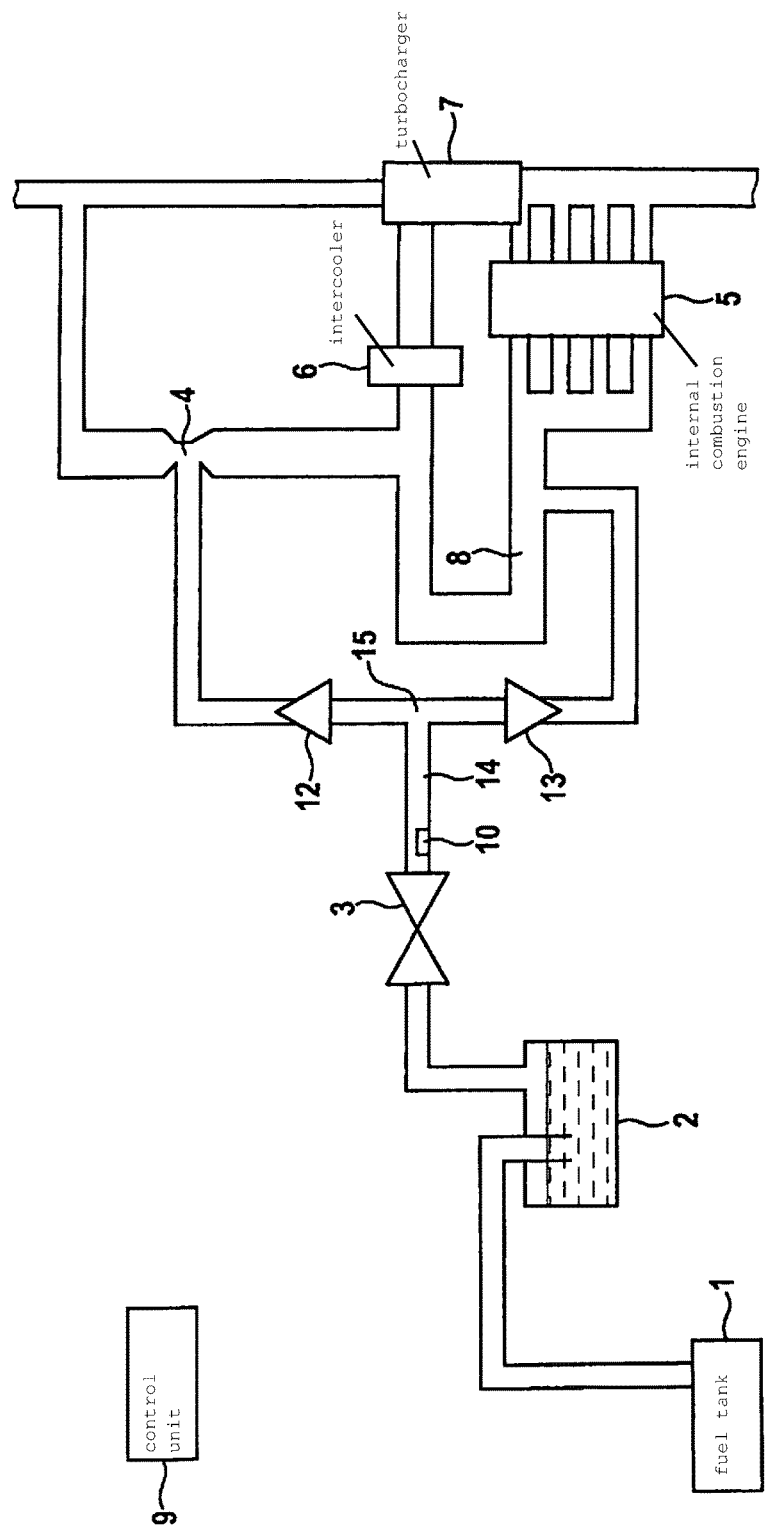
FIG. 1 shows a schematic illustration of a tank ventilation system, an internal combustion engine, as well as a control unit of a motor vehicle according to the related art.

FIG. 1 schematically shows a tank ventilation system of a motor vehicle (not shown), an internal combustion engine 5, and a control unit 9 of the motor vehicle according to the related art. The tank ventilation system includes a fuel tank 1, an adsorption filter 2, as well as a tank vent valve 3. In this device for tank venting shown in FIG. 1 as well as in the device for tank-venting shown in FIG. 3, adsorption filter 2 is designed as an activated carbon filter. Between tank vent valve 3 and an inlet point 15 into an intake manifold 8 and into a turbocharger 7 is a tank vent line 14, within which a temperature sensor 10 is situated in such a way that it is heated by the waste heat of internal combustion engine 5. The tank ventilation system furthermore includes two one-way valves 12 and 13 as well as a Venturi nozzle 4. Internal combustion engine 5 is a charged engine including turbocharger 7 and an intercooler 6. Intake manifold 8 connects internal combustion engine 5 and intercooler 6.

The method for detecting a sticking of tank vent valve 3 proceeds as follows. Initially, temperature sensor 10 is heated by internal combustion engine 5 to a temperature $T_0$ above ambient temperature $T_R$ by an applicatively predefinable $\Delta T$. Thereafter, a tank venting is carried out, meaning that tank vent valve 3 is opened and a tank ventilation mass flow $m_{reg}$ streams through tank vent line 14. Since tank ventilation mass flow $m_{reg}$ exhibits only a temperature that corresponds to ambient temperature $T_R$, temperature sensor 10 experiences a temperature decrease $\Delta T_2$ due to tank ventilation mass flow $m_{reg}$ flowing by so that the tank vent valve then exhibits a temperature of $T_1 = T_0 - \Delta T_2$. This process is illustrated in FIG. 2.

Figure 2:
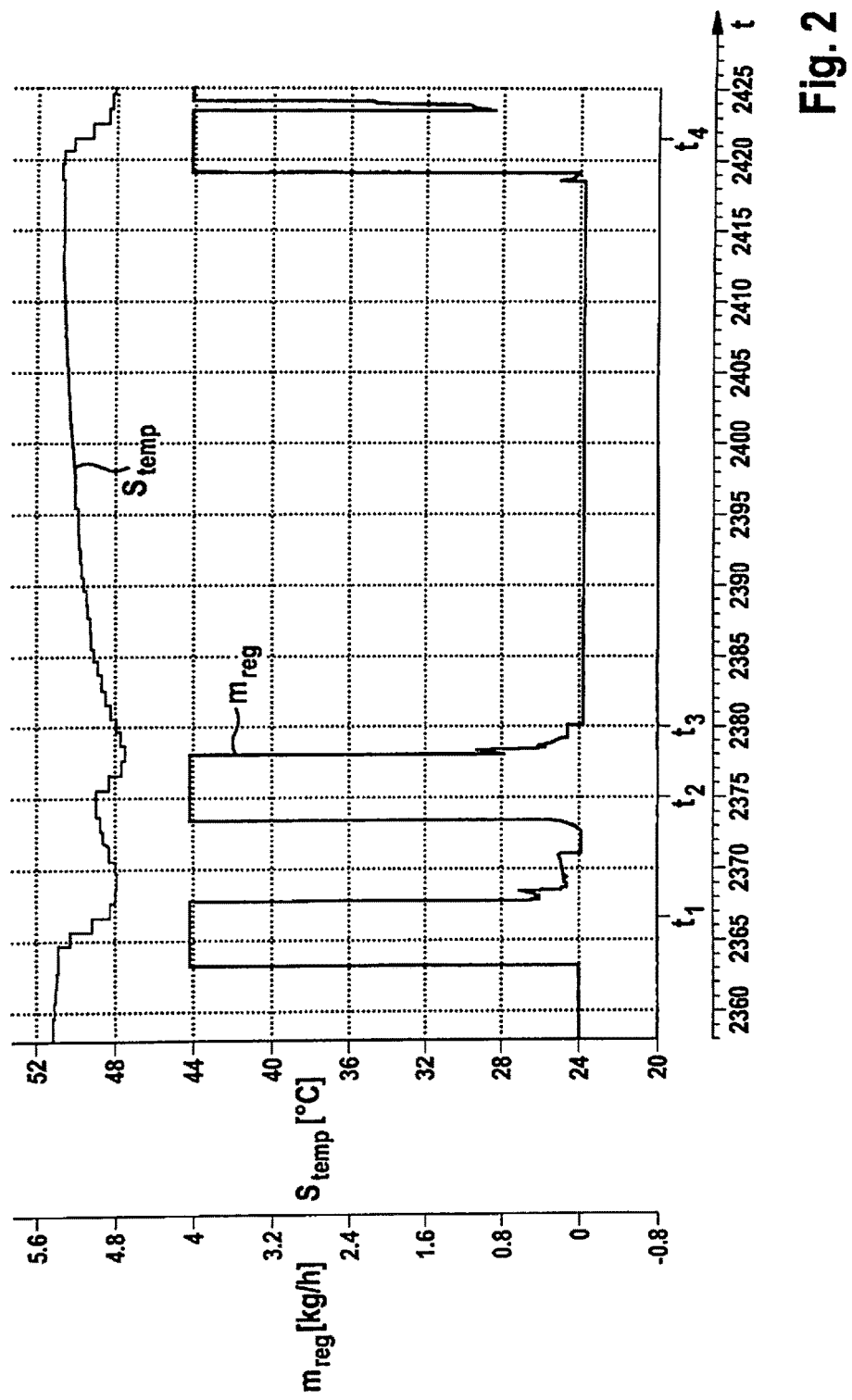
FIG. 2 shows a schematic illustration of the intensity of the tank ventilation mass flow and the intensity of the temperature sensor signal over time.

FIG. 2 schematically shows the chronological sequence of a tank ventilation mass flow $m_{reg}$ in kg/h as well as the chronological sequence of a signal $s_{temp}$ of temperature sensor 10 in ° C. At points in time $t_1$, $t_2$, and $t_4$, a clear correlation between tank ventilation mass flow $m_{reg}$ and the absolute value of temperature signal $s_{temp}$ is apparent. When tank ventilation mass flow $m_{reg}$ rises, signal $s_{temp}$ of temperature sensor 10 drops. As soon as tank ventilation mass flow $m_{reg}$ has fallen to zero, i.e., at point in time $t_3$, signal $s_{temp}$ of temperature sensor 10 begins to rise again because internal combustion engine 5 heats up temperature sensor 10 again and no cooling through a tank ventilation mass flow takes place. Due to temperature decrease $\Delta T_2$, presence of tank ventilation mass flow $m_{reg}$ is deduced and it is assumed that tank vent valve 3 is operational.

In this first specific embodiment of the method, when tank vent valve 3 is being activated, a closed sticking of tank vent valve 3 is detected. In this case, due to closed sticking tank vent valve 3, the real tank ventilation mass flow via tank vent valve 3 is zero kg/h and no cooling of temperature sensor 10 takes place. However, a tank ventilation mass flow $m_{reg,b}$ is calculated from the environmental conditions, i.e., with the aid of the setpoint activation. This calculated tank ventilation mass flow $m_{reg,b}$ is correlated in the following with the signal of temperature sensor 10. If the absolute value of this correlation falls below a predefinable threshold value $s_1$, in the present case $|s_1|=0.75$, a closed sticking of tank vent valve 3 is detected.

In a second specific embodiment of the method, when tank vent valve 3 is not being activated, an open sticking of tank vent valve 3 is detected. In this second case, the calculated tank-ventilation mass flow $m_{reg,b}$ is zero kg/h via the tank vent valve 3 since tank vent valve 3 is expected to be closed. The real tank ventilation mass flow via tank vent valve 3 is greater than zero kg/h, however, due to the defect of tank vent valve 3. In this second case as well, the calculated tank ventilation mass flow $m_{reg,b}$ is correlated with the signal of temperature sensor 10. If the absolute value of the correlation exceeds a second predefinable threshold value $s_2$, in the present case $|s_2|=0.3$, an open sticking of tank vent valve 3 is detected.

The method for detecting a sticking tank vent valve 3 is discontinued when the speed of the motor vehicle and/or the speed of internal combustion engine 5 changes by more than an applicable threshold value. In both cases, a clear change in the particular operating condition results in a drastic change in the temperature of tank vent line 14, which directly affects temperature sensor 10. Since this may result in a misinterpretation of the signal of temperature sensor 10, the method is discontinued.

Figure 3:
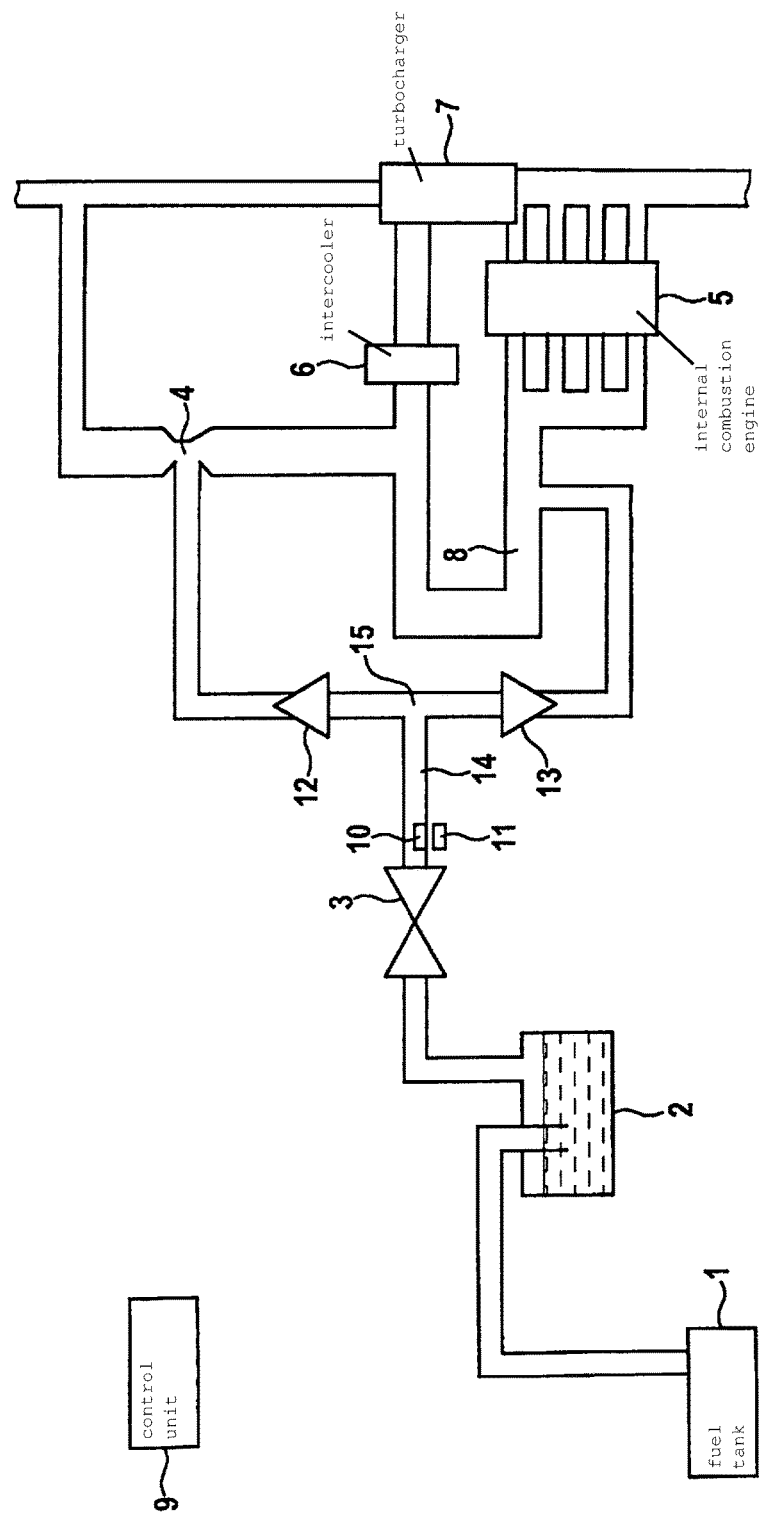
FIG. 3 shows a schematic illustration of an internal combustion engine, a control unit, as well as another tank ventilation system.

FIG. 3 shows a schematic illustration of an internal combustion engine, of a control unit, as well as of another tank ventilation system. The difference to the tank ventilation system shown in FIG. 1 is that in the tank ventilation system in FIG. 3, a reference temperature sensor 11 is situated outside of tank vent line 14. The signal of this reference temperature sensor 11 may be taken into account in both specific embodiments of the method described above to detect a sticking tank vent valve 3 in order to deduce the presence of a tank ventilation mass flow $m_{reg}$. Since reference temperature sensor 11 is positioned outside of tank vent line 14, the signal of reference temperature sensor 11 is not affected by the tank ventilation mass flow $m_{reg}$ flowing by. In the tank ventilation system shown in FIG. 3, however, reference temperature sensor 11 is situated outside of the tank vent line, facing temperature sensor 10. This means that initially, temperature sensor 10 as well as reference temperature sensor 11 is heated by internal combustion engine 5 to a temperature $T_0$ above ambient temperature $T_R$ by a predefinable $\Delta T$. While temperature sensor 10 experiences a decrease in temperature $\Delta T_2$ due to tank ventilation mass flow $m_{reg}$ flowing by, reference temperature sensor 11 remains at temperature $T_0$. The difference in temperature is obtained by comparing the signals of temperature sensor 10 and of reference temperature sensor 11, on account of which the presence of tank ventilation mass flow $m_{reg}$ may be deduced.

If reference temperature sensor 11 is used, it no longer necessary to discontinue the method for detecting the sticking of tank vent valve 3 when the motor vehicle speed or the speed of internal combustion engine 5 changes quickly since the effect of a change in the temperature of tank vent line 14 is nullified by the use of reference temperature sensor 11.

What is claimed is:

1. A method for detecting a sticking tank vent valve in a motor vehicle, a temperature sensor being situated in a tank vent line between the tank vent valve and an inlet point into an intake manifold or into a turbocharger, the method comprising:
    detecting a sticking of the tank vent valve when the absolute value of a correlation of a computed tank ventilation mass flow and of a signal value of the temperature sensor violates a predefinable threshold value.

2. The method as recited in claim 1, wherein when the tank vent valve is being activated, a closed sticking of the tank vent valve is detected if the absolute value of the correlation of a computed tank ventilation mass flow and of the signal value of the temperature sensor falls below a predefinable threshold value.

3. The method as recited in claim 1, wherein when the tank vent valve is not being activated, an open sticking of the tank vent valve is detected if the absolute value of the correlation of a computed tank ventilation mass flow and of the signal value of the temperature sensor exceeds a predefinable threshold value.

4. The method as recited in claim 1, wherein diagnosing of the tank vent valve is discontinued when at least one operating condition of the motor vehicles changes by more than an applicable threshold value.

5. The method as recited in claim 4, wherein the changing operating condition is at least one of a motor vehicle speed and an internal combustion engine speed.

6. The method as recited in claim 1, wherein a signal of a reference temperature sensor, which is situated outside of the tank vent line, is taken into account when detecting a sticking tank vent valve.

7. A non-transitory machine-readable memory medium on which is stored a computer program for detecting a sticking tank vent valve in a motor vehicle, a temperature sensor being situated in a tank vent line between the tank vent valve and an inlet point into an intake manifold or into a turbocharger, the computer program, when executed by a control unit, causing the control unit to perform:
    detecting a sticking of the tank vent valve when the absolute value of a correlation of a computed tank ventilation mass flow and of a signal value of the temperature sensor violates a predefinable threshold value.

8. An electronic control unit for detecting a sticking tank vent valve in a motor vehicle, a temperature sensor being situated in a tank vent line between the tank vent valve and an inlet point into an intake manifold or into a turbocharger, the control unit configured to:
    detecting a sticking of the tank vent valve when the absolute value of a correlation of a computed tank ventilation mass flow and of a signal value of the temperature sensor violates a predefinable threshold value.

* * * * *